Patented Feb. 25, 1947

2,416,563

UNITED STATES PATENT OFFICE 2,416,563

QUINOLINE DERIVATIVES

Frederick Robert Basford, Manchester, Harold Coates, Leeds, and Ian Morris Heilbron and Arthur Herbert Cook, London, England, assignors to Imperial Chemical Industries Limited, a corporation of Great Britain No Drawing. Application March 24, 1943, Serial No. 480,382. In Great Britain March 30, 1942

4 Claims. (Cl. 260—288)

This invention relates to the manufacture of quinoline derivatives and is an extension of that which is the subject of British Patent No. 544,190.

That invention provides a process for the manufacture of quinoline derivatives by treating an α-, β- or γ-aminophenylpyridine, wherein the phenyl radical may carry one or more chloro, nitro, methyl or methoxy substituents but must have at least one of the positions ortho to the amino group free, with glycerol in the presence of an oxidising agent as defined and sulphuric acid. The said compounds have properties such as make them valuable as medicinals. Some of them are useful as spasmolytic agents.

We have now found that analogous new quinoline derivatives having similar valuable properties may be obtained by carrying out the same reaction upon α-, β- or γ-aminophenylpyridines wherein the phenyl radical carries one or more of the following substituents, namely, bromo, iodo, alkyl of at least two carbon atoms, alkoxy of at least two carbon atoms, hydroxy and aryloxy, but must have at least one of the positions ortho to the amino group free. These new compounds also are useful as spasmolytic agents.

According to the present invention, therefore, we make new quinoline derivatives by a process which comprises treating an α-, β- or γ-aminophenylpyridine, wherein the phenyl radical carries one or more of the following substituents, namely, bromo, iodo, alkyl of at least two carbon atoms, alkoxy of at least two carbon atoms, hydroxy or aryloxy, but must have at least one of the positions ortho to the amino group free, with glycerol in the presence of an oxidising agent as further defined below and sulphuric acid.

The aminophenylpyridines which are used as starting materials may be made by reducing the corresponding nitrophenylpyridines, which themselves may be conveniently be obtained by combining the diazo compounds of the appropriate nitroanilines with pyridine by the method described in British Patent 518,886. The immediate products of this invention are frequently mixtures of isomeric nitrophenyl-α-, β- and γ-pyridines. The mixed amines obtained by reduction of these mixtures of nitro-compounds may be used as such in the present invention or if desired the individual compounds may be separated before or after the reduction and separately used as starting materials.

The oxidising agents to be used in the present invention are arsenic oxide, nitrobenzene, m-nitrobenzenesulphonic acid and other compounds known to be suitable for use as oxidising agents in the Skraup synthesis of quinolines (for which see for example Houben "Die Methoden der organischen Chemie, 3d Edt., Leipzig, 1925, vol. 2, p. 918).

The following examples illustrate, but do not limit, the invention. The parts are by weight.

Example 1

12.5 parts of 3-amino-4-ethoxyphenylpyridine are mixed with 100 parts of 66% sulphuric acid, 19 parts of sodium m-nitrobenzenesulphonate and 14 parts of glycerol. The mixture is gently boiled under a reflux condenser for 3 hours, after which it is diluted with water and made alkaline with ammonia. The oil which separates out is extracted with benzene, the benzene layer being separated and dried. The benzene is distilled off whereupon an oil remains. This is crude 5-pyridyl-8-ethoxyquinoline (mixed α-, β- and γ-isomers), and may be represented by the formula

wherein Py designates the pyridyl radical, $C_5H_4N$ (α, β or γ). It is purified by distilling under reduced pressure. It boils at 200–240° C. at 0.15 mm. pressure.

The 3-amino-4-ethoxyphenylpyridine used as starting material is obtained from p-phenetidine by diazotising and condensing with pyridine in the manner described in British Patent 518,886 and then nitrating and reducing the nitro compound so obtained.

Example 2

7.7 parts of 3-amino-4-phenoxyphenylpyridine (prepared by condensing the diazonium salt from 4-amino-2-acetylamino-diphenyl ether with pyridine according to the method of British Patent No. 518,886) are mixed with 50 parts of 66% sulphuric acid, 7 parts of glycerine and 9.5 parts of sodium m-nitrobenzene sulphonate. The mixture is boiled under reflux for 4 hours and is then diluted with water and made alkaline with ammonia. An oil separates out and is extracted with benzene. The benzene solution is dried and the benzene is distilled off. An oil remains. This is a crude mixture of the isomeric 5-pyridyl-8- phenoxyquinolines, which may be represented by the formula

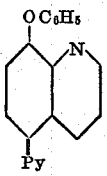

wherein Py has the same significance as above. It is distilled under diminished pressure and the purified 5-pyridyl-8-phenoxyquinoline fraction is collected at 250–280° C. at 0.25 mm. pressure.

*Example 3*

14.7 parts of 3-bromo-4-aminophenylpyridine (obtained by diazotising 2-bromo-4-amino-acetanilide and condensing with pyridine, followed by hydrolysis), 100 parts of 66% sulphuric acid, 14 parts of glycerol and 19 parts of sodium m-nitrobenzene sulphonate are boiled under reflux for 3½ hours. The mixture is diluted with water, made alkaline with ammonia, and extracted with benzene. The benzene extract is dried and distilled. The fraction containing the mixed 8-bromo-6-pyridylquinolines

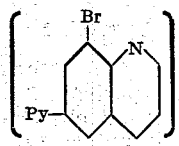

distils over at 220–235° C. under 0.75 mm. pressure.

*Example 4*

22 parts of 2-amino-4-tert-butyl-phenylpyridine, 146 parts of 64% sulphuric acid, 33.5 parts of glycerol, and 39 parts of sodium m-nitrobenzene sulphonate are heated under reflux at 160° C. for 6½ hours. The solution is cooled and filtered and then made alkaline with ammonia. A tarry mass separates out on standing. This is extracted with benzene. The extract is distilled and the fraction containing the mixed 5-tert-butyl-8-pyridylquinolines

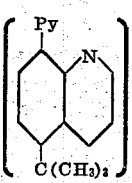

is collected as a pale yellow oil B. P. 120° C. at 0.00002 mm. pressure.

The 2-amino-4-tert-butyl-phenylpyridine used as starting material is obtained by diazotising 3-nitro-4-amino-tert-butylbenzene (for which see Gelzer, Berichte 1887, 20, 3257) and condensing with pyridine, and then reducing the product with stannous chloride and hydrochloric acid.

*Example 5*

2 parts of α-(4-hydroxy-3-aminophenyl)-pyridine, 12 parts of 63% sulphuric acid, 2.4 parts of glycerol and 2 parts of sodium m-nitrobenzene sulphonate are heated under reflux at 160° C. for 5 hours. The solution is cooled, diluted with 20 parts of water, filtered, and made faintly alkaline with 10% sodium hydroxide solution. A brown precipitate is formed. This is filtered off and extracted with benzene and the extract is clarified with charcoal. The benzene solution is then evaporated down to small bulk and light petroleum is added. This precipitates 8-hydroxy-5-(α-pyridyl)-quinoline

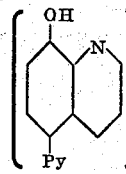

which is filtered off and dried. It may be purified by sublimation in vacuo, when it yields colourless crystals M. P. 133.5–134° C.

The α-(4-hydroxy-3-aminophenyl)-pyridine used as starting material is prepared from the corresponding α-(4-aminophenyl)-pyridine which is itself obtained by reduction of α-(4-nitrophenyl)-pyridine (made by the method described in British Patent No. 518,886). The α-4-aminophenyl)-pyridine is nitrated, boiled with caustic alkali to replace the NH₂ group by OH and then reduced.

We claim:

1. New pyridyl-quinolines of the formula

wherein the pyridyl group is attached by any of its carbon atoms to any position in the phenyl ring of the quinolyl radical, said phenyl ring bearing also at least one substituent selected from the group consisting of bromo, iodo, tert-butyl, ethoxy, hydroxy and phenoxy.

2. Pyridyl quinolines of the formula

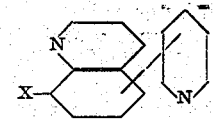

wherein X stands for a substituent selected from the group consisting of bromo, iodo, tert-butyl, ethoxy, hydroxy and phenoxy, and wherein the pyridyl group is attached by any of its carbon atoms to any of the positions in the phenyl ring of the quinolyl radical, except the one shown occupied by X.

3. An 8-ethoxy-5-pyridyl-quinoline.

4. An 8-bromo-6-pyridyl-quinoline.

FREDERICK ROBERT BASFORD.
HAROLD COATES.
IAN MORRIS HEILBRON.
ARTHUR HERBERT COOK.

REFERENCES CITED

The following references are of record in the file of this patent:

FOREIGN PATENTS

| Number | Country | Date |
|---|---|---|
| 544,190 | British | Apr. 1, 1942 |
| 549,967 | German | May 6, 1932 |

OTHER REFERENCES

Chem. Abstracts, vol. 29, page 69507; vol. 30, page 41671.

"Berichte," vol. 19, page 2475.

Hollins, "Synthesis of Nitrogen Ring Compounds," D. Van Nostrand Co., N. Y., 1924, pages 245–50. (Copy in Div. 59.)

Chem. Soc. Jour. (London), 1943, pages 401–406. (Copies in Pat. Off. Lib.)

Rubstov, J. Gen. Chem. (U. S. S. R.), vol. 9 (1939), p. 1519.